United States Patent
Brooks et al.

(10) Patent No.: US 9,983,970 B2
(45) Date of Patent: May 29, 2018

(54) REDUNDANT CABLE ROUTING MANAGEMENT IN STORAGE SYSTEMS

(71) Applicant: Oracle International Corporation, Redwood City, CA (US)

(72) Inventors: Stephen Brooks, Thornton, CO (US); Gavin Gibson, Westminster, CO (US); Sudha Verma, Superior, CO (US); Yidong Zhang, Superior, CO (US); Robert Johnston, Stockton, CA (US); Todd McKenney, Westminster, CO (US); Pascal Ledru, Boulder, CO (US); Christopher Horne, Boulder, CO (US); Stephen Hanson, Reading (GB)

(73) Assignee: Oracle International Corporation, Redwood, CA (US)

( * ) Notice: Subject to any disclaimer, the term of this patent is extended or adjusted under 35 U.S.C. 154(b) by 191 days.

(21) Appl. No.: 15/091,721

(22) Filed: Apr. 6, 2016

(65) Prior Publication Data

US 2017/0293545 A1 Oct. 12, 2017

(51) Int. Cl.
| G06F 13/00 | (2006.01) |
| G06F 11/30 | (2006.01) |
| G06F 13/42 | (2006.01) |
| G06F 13/38 | (2006.01) |
| G06F 11/20 | (2006.01) |

(52) U.S. Cl.
CPC ...... *G06F 11/3051* (2013.01); *G06F 11/3034* (2013.01); *G06F 11/3089* (2013.01); *G06F 13/382* (2013.01); *G06F 13/4282* (2013.01); *G06F 11/201* (2013.01)

(58) Field of Classification Search
CPC ............... G06F 11/3051; G06F 13/382; G06F 11/3089; G06F 11/3034; G06F 13/4282; G06F 11/201

See application file for complete search history.

(56) References Cited

U.S. PATENT DOCUMENTS

| 5,522,046 | A | * | 5/1996 | McMillen | G01J 3/06 370/217 |
| 6,809,505 | B2 | * | 10/2004 | Peeke | G06F 13/409 324/538 |
| 7,058,844 | B2 | | 6/2006 | Wiley et al. | |
| 7,502,669 | B1 | * | 3/2009 | Evans | G11B 33/10 700/302 |
| 7,594,134 | B1 | * | 9/2009 | Coatney | G06F 11/201 714/3 |
| 7,694,029 | B2 | * | 4/2010 | Kubo | H04L 41/0866 710/10 |
| 8,862,722 | B2 | * | 10/2014 | Smith | H04L 41/069 709/200 |
| 2008/0195581 | A1 | * | 8/2008 | Ashmore | G06F 3/0607 |

(Continued)

Primary Examiner — Jing-Yih Shyu
(74) Attorney, Agent, or Firm — Marsh Fischmann & Breyfogle LLP; Jonathon A. Szumny (57) ABSTRACT

Utilities (e.g., methods, systems, apparatuses, etc.) for use in automatically identifying improper physical connections in storage networks and recommending particular actions (e.g., changes to existing physical connections) that seek to ensure symmetric and redundant connections from a data host through all associated storage enclosures and reduce the likelihood that single failures prevent access to storage system data.

19 Claims, 7 Drawing Sheets

(56) References Cited

U.S. PATENT DOCUMENTS

| | | | |
|---|---|---|---|
| 2009/0193158 A1* | 7/2009 | Takeda | G06F 11/0727 |
| | | | 710/16 |
| 2011/0196958 A1* | 8/2011 | Bharadwaj | H04L 67/1097 |
| | | | 709/224 |
| 2013/0246683 A1* | 9/2013 | Natrajan | G06F 11/3051 |
| | | | 710/316 |
| 2015/0032928 A1 | 1/2015 | Andrews et al. | |

* cited by examiner

REDUNDANT CABLE ROUTING MANAGEMENT IN STORAGE SYSTEMS

BACKGROUND

1. Field of the Invention

The present invention generally relates to storage systems such as daisy-chained storage enclosures and, more particularly, to the identification and rectification of improper cable connections in such storage systems.

2. Relevant Background

A typical storage system includes one or more racks of storage devices or enclosures (e.g. just a bunch of disks (JBODs) or the like). A loop is a common topology in which the enclosures of a storage system are connected where communication signals traverse the loop in one direction and pass from enclosure to enclosure in a daisy-chain fashion. Enclosures receiving communication signals targeted for another enclosure forward those signals along the loop.

As one simplistic example, each storage enclosure may include a plurality of disk modules along with first and second redundant sets of communications ports (e.g., expanders). One host bus adapter (HBA) of a host computer may be cabled to a first of the first set of ports of a first storage enclosure and another HBA of the host computer may be cabled to a first of the second set of ports of the second storage enclosure. Furthermore, another of the first set of ports of the first storage enclosure may be cabled to one of the first set of ports of the second storage enclosure and one of the second set of ports of the first storage enclosure may be cabled to another of the second set of ports of the second storage enclosure. The resulting arrangement is a daisy-chained arrangement whereby redundant communications loops or paths exist from the host computer to each of the storage enclosures.

As storage systems become increasingly sophisticated to accommodate the increasing demands of today's society, the cabling between storage enclosures has also become increasingly complicated. For instance, some storage systems employ multiple backend loops which increases the number of cables that connect to each storage enclosure and oftentimes causes cables to cross over other cables. As another example, the particular layout of the storage enclosures, power supplies thereof, and the like may vary requiring the use of longer cables. In some arrangements, the final product can appear like a tangled nest of cables and the possibility that the storage system has one or more improper cable connections becomes more likely. The general industry solution to identifying possible improper cable connections is for a technician or the like to evaluate one or more cable configuration maps or diagrams delivered with the system and use the diagrams as a guide to manually identify improper connections and rectify the same. However, doing so is often an inexact and timely process which becomes increasingly more difficult and less trustworthy with increases in cables, storage enclosures, ports, and the like.

SUMMARY

In view of the foregoing, disclosed herein are utilities (e.g., methods, systems, etc.) for use in automatically identifying improper cable connections (e.g., independent of a user's observations) in storage systems or networks and recommending particular actions that seek to ensure symmetric and redundant connections from a data host through all associated storage enclosures and reduce the likelihood that single failures prevent access to storage system data. After a storage system has been initially cabled (e.g., with Serial Attached SCSI (SAS) cables or the like), a topology of the storage system may be generated in any appropriate manner, such as by collecting information from the system via a number of topology enumerators. Each enumerator includes functionality created to collect data for one or more particular types of components such as the Peripheral Component Interconnect (PCI) bus, each HBA of the host computer(s), and the like. For instance, each enumerator may collect information regarding the component as well as other devices to which the component is attached such as addresses for the cable ports, physical layer (PHY) mask of attached cables, and the like.

The generated topology may be in the form of a map or tree structure of interconnected nodes (e.g., objects), where each node is a structure that describes or defines a component (e.g., enclosure, HBA, expander, etc.) and/or sub-components thereof (e.g., ports, etc.) by way of including a local addresses of the component or sub-component, remote port addresses to which the component or sub-components is cabled, and the like. One or more lists of components (e.g., ports, HBAs, etc.) in the generated topology that can be connected by cables may be constructed, where each cable may be defined by the ports that form its end points. For instance, each port may be defined by a number of properties such as local addresses (e.g., the address of the port such as a World Wide Port Name (WWN) and the address of the node/component on which the port resides such as World Wide Node Name (WWNN)), remote address (e.g., the addresses of the remote port to which the port is connected), PHY masks, hosting components, and the like.

Starting with a first port of an HBA of the at least one host computer, the generated topology and lists of components may be recursively examined to identify the chain of enclosures and then the redundant side of the chain as the recursion unwinds back to a second port of the HBA. As the chain and redundant side thereof are examined, one or more rules may be applied to the information of each port in the chain to identify whether any improper cable connections may exist. For instance, the first port of the HBA may include a local address that identifies the first port and a remote address that identifies a first remote port of a storage enclosure to which the HBA is allegedly connected by a cable. Upon examination of the information for the first remote port, determination that the remote address for the first remote port is not the local address of the first HBA port would indicate that the cable may be interfaced with an improper port that is interfering with the communication loop around the storage enclosures. As another example, the disclosed utilities may include a rule stipulating that there must be dual paths between each adjacent set of segments (e.g., expanders, etc.) in the chain. Stated different, the rule may stipulate that when a port of a first expander of a first storage enclosure includes a remote address (e.g., WWNN) of a first expander of an adjacent storage enclosure, a port of a second expander of the first storage enclosure must include an address corresponding to a port of a second expander of the adjacent storage enclosure.

In the event one or more of the disclosed rules is broken or otherwise not satisfied, the disclosed utilities may be configured to generate and output specific actions to take to remedy the one or more improper connections. In the second example above, for instance, the disclosed utilities may be configured to output, on any appropriate user interface, an indication of the problem cable(s) (e.g., by way of providing the addresses of both ends thereof) as well as a recommendation as to the particular port(s) to which the end(s) of the cable(s) is supposed to be interfaced. For instance, the output could indicate that the cable between enclosure A, IOM B Port C is currently connected to enclosure X, IOM B, Port C, whereas it should be connected to enclosure X IOM B, Port D. Other representative examples of conditions under which the disclosed utilities may identify as being associated with improper cable connections include inability to locate a return path back to the host computer, locating a return path back to the host computer but skipping an expected storage enclosure, locating a return path back to the host computer but a cable is connected to an unexpected port on an expected expander, and/or the like.

To inhibit false positives that may occur during user changes to the storage system, the utilities may automatically detect system topology changes in progress and dynamically suspend rule application for any appropriate period of time; doing so can allow user time to complete physical changes such as adding storage or changing a cable connection point while masking noise so as to accurately represent changes to the system.

In one aspect, a method for use in a storage system includes receiving, at a host computer that is interconnected to a string of storage enclosures, connection information from each of a plurality of components of the string of storage enclosures; generating, by a processor of the host computer with the received connection information, a topological map of the storage system that logically represents physically cabled connections between components of the host computer and/or the string of storage enclosures; analyzing, by the processor, the physically cabled connections in the generated topological map; and providing, by the process, an output based on a result of the analyzing.

In one arrangement, each cabled connection in the topological map may be represented by connection information of two components, where the analyzing includes analyzing at least the connection information for at least one of the two components. As an example, the analyzing may include applying, by the processor, a set of rules to at least the connection information for the at least one of the two components, wherein the set of rules queries whether the physically cabled connection follows at least one standard or guideline. For instance, the set of rules may make at least one of the following queries: whether a communication path from the at least one of the two components to the host computer skips an expected component; whether a communication path from the at least one of the two components to the host computer is connected to an unexpected component; whether only a single communication path from the at least one of the two components back to the host computer can be found; whether first and second different communication paths from the at least one of the two components to a host bus adapter of the host computer are found; whether a port of a host bus adapter of the host computer is unused; whether a number of physically cabled connections to a storage enclosure of the string of storage enclosures is greater than a threshold number of physically cabled connections; whether a type of one of the storage enclosures in the string of storage enclosures is different than a type of another of the storage enclosures in the string of storage enclosures; whether a type of one of the storage enclosures in the string of storage enclosures is unsupported by the host computer; whether an expected expander of one of the storage enclosures in the string of storage enclosures is missing; or whether the number of storage enclosures in the string of storage enclosures is greater than a threshold number of storage enclosures.

In another aspect, a storage system includes a string of interconnected storage enclosures that are electrically connected together by a plurality of physical connections; and at least a first host server electrically connected to the string of interconnected storage enclosures by a plurality of physical connections. The first host server includes a processor and a non-transitory computer readable memory including a set of computer readable instructions that are executable by the processor to determine whether the plurality of physical connections between the adjacent ones of the interconnected storage enclosures and between the first host server and the string of interconnected storage enclosures complies with at least one standard or guideline for ensuring dual path routing between each storage enclosure and the first host computer; and generate one or more changes to the plurality of physical connections based on the determining.

In a further aspect, a host server includes a first HBA for physical interconnection to a first end of a string of interconnected storage enclosures, a second HBA for physical interconnection to an opposite second end of a string of interconnected storage enclosures, a processor, and a non-transitory computer readable memory including a set of computer readable instructions. The set of computer readable instructions of the non-transitory computer readable memory are executable by the processor to first determine whether first communication paths exist between each of the storage enclosures and the first HBA; second determine whether second communication paths exist between each of the storage enclosures and the second HBA; and provide an output based on the first and second determining.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein are utilities (e.g., methods, systems, apparatuses, etc.) for use in automatically identifying improper physical connections in storage networks and recommending particular actions (e.g., changes to existing physical connections) that seek to ensure symmetric and redundant connections from a data host through all associated storage enclosures and reduce the likelihood that single failures prevent access to storage system data. The disclosed utilities allow users to immediately observe an analysis of their current storage network configuration and to reduce the chances of single failures limiting user access to data which is a significant improvement over the existing manual process of tracing cabling by eye. The ability to mask transitional states that occur as users change physical configurations (e.g., repair or capacity change operations) further provides a more accurate system representation.

Figure 1:
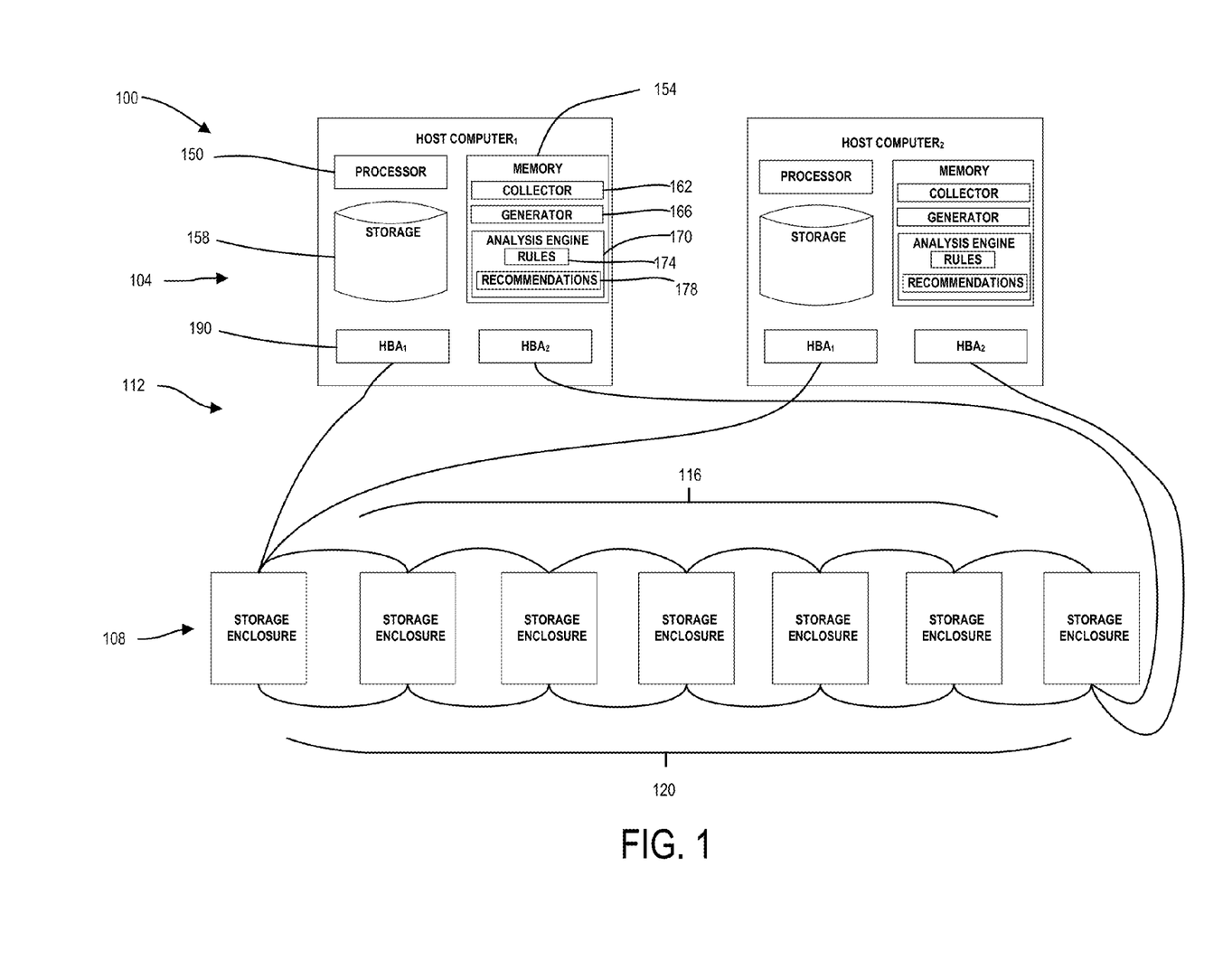
FIG. 1 is a block diagram of a storage system including first and second host computers or servers daisy-chained to a string of storage enclosures.

With initial reference to FIG. 1, a simplified block diagram is provided of a storage network or system 100 (e.g., storage area network (SAN)) made up of one or more host servers or computers 104 physically electrically interconnected to a string of interconnected storage enclosures 108 (e.g., JBODs or the like) in a manner that provides redundant communication paths between each host computer 104 and the string of interconnected storage enclosures 108. For instance, each host computer 104 may include a memory 154 (e.g., volatile storage device such as one or more DRAM devices or the like), a processor 150 (e.g., one or more processing or processor devices or cores for executing instructions and processing data from memory 154, etc.), storage 158 (e.g., non-volatile computer readable medium on which data and/or sets of computer-readable instructions may be stored and then loaded into memory 154), one or more input/output interfaces, and the like, all of which may be appropriately communicatively interconnected via one or more interconnects/busses (not shown) and/or the like.

In relation to input/output interfaces, each host computer 104 may include at least first and second HBAs 190 (e.g., circuit board and/or integrated circuit adapter such as Fibre Channel interface cards or the like) to provide processing and physical connectivity between the host computer 104 and the string of interconnected storage enclosures 108. Each HBA 190 may include a plurality of ports (not shown in FIG. 1) for respectively electrically connecting the HBA 190 (and thus the host computer 104) to one or more corresponding ports of the string of storage enclosures 108. Furthermore, each HBA 190 may be defined by at least first and second different types of addresses that that facilitate identification of the HBA 190 within the system 100 and data transmission between the correct source and target devices or components within the system 100. For instance, each HBA 190 may include or be defined/identified by a unique first address (e.g., World Wide Name (WWN)) such as a World Wide Node Name (WWNN) that is unique to all other WWNNs and that is shared by all ports of the HBA 190. Furthermore, each port of the HBA 190 may include or be defined/identified by a second address such as a World Wide Port Name (WWPN) that is unique as to all other ports on the HBA 190.

For purposes of communication redundancy between each host computer 104 and the string of interconnected storage enclosures 108, a first chain of physical connections 116 (e.g., cables) may successively interconnect adjacent pairs of storage enclosures 108 (e.g., on one side of the storage enclosures 108) while a second chain of physical connections 120 (e.g., separate cables) may successively interconnect adjacent pairs of storage enclosures 108 (e.g., on an opposite second side of the storage enclosures 108). For instance, each storage enclosure 108 may include first and second port expanders (not shown in FIG. 1), where the first chain of physical connections 116 is successively interconnected to the first port expanders of the storage enclosures 108 while the second chain of physical connections 120 is successively interconnected to the second port expanders of the storage enclosures 108.

Furthermore, the HBAs 190 of each host computer 104 may be respectively connected to the first and second chains of physical connections 116, 120 of the string of storage enclosures 108 by respective physical connections 112 (e.g., cables). More specifically, the first $HBA_1$ 190 of each host computer 104 may be connected to a port of a first port expander of a first storage enclosure 108 on a first end of the string by a first cable 112 while the second $HBA_2$ 190 of each host computer 104 may be connected to a port of a second port expander of another storage enclosure 108 on an opposite end of the string by a second cable 112. While not shown in FIG. 1 in the interest of clarity, there are different respective first and second chains of physical connections 116, 120 for each host computer 104.

With an increase in the number of host computers 104 and storage enclosures 108 in the storage system 100, an increasing number of physical connections 112, 116, 120 must be made to ensure full redundancy and a corresponding increase in the number of possible improper physical connections among the various components of the system 100. Previous and existing attempts to identify and remedy improper physical connections consists of users manually referring to wiring diagrams and physically identifying and correcting improper connections which is a time consuming and laborious process.

Figure 5:
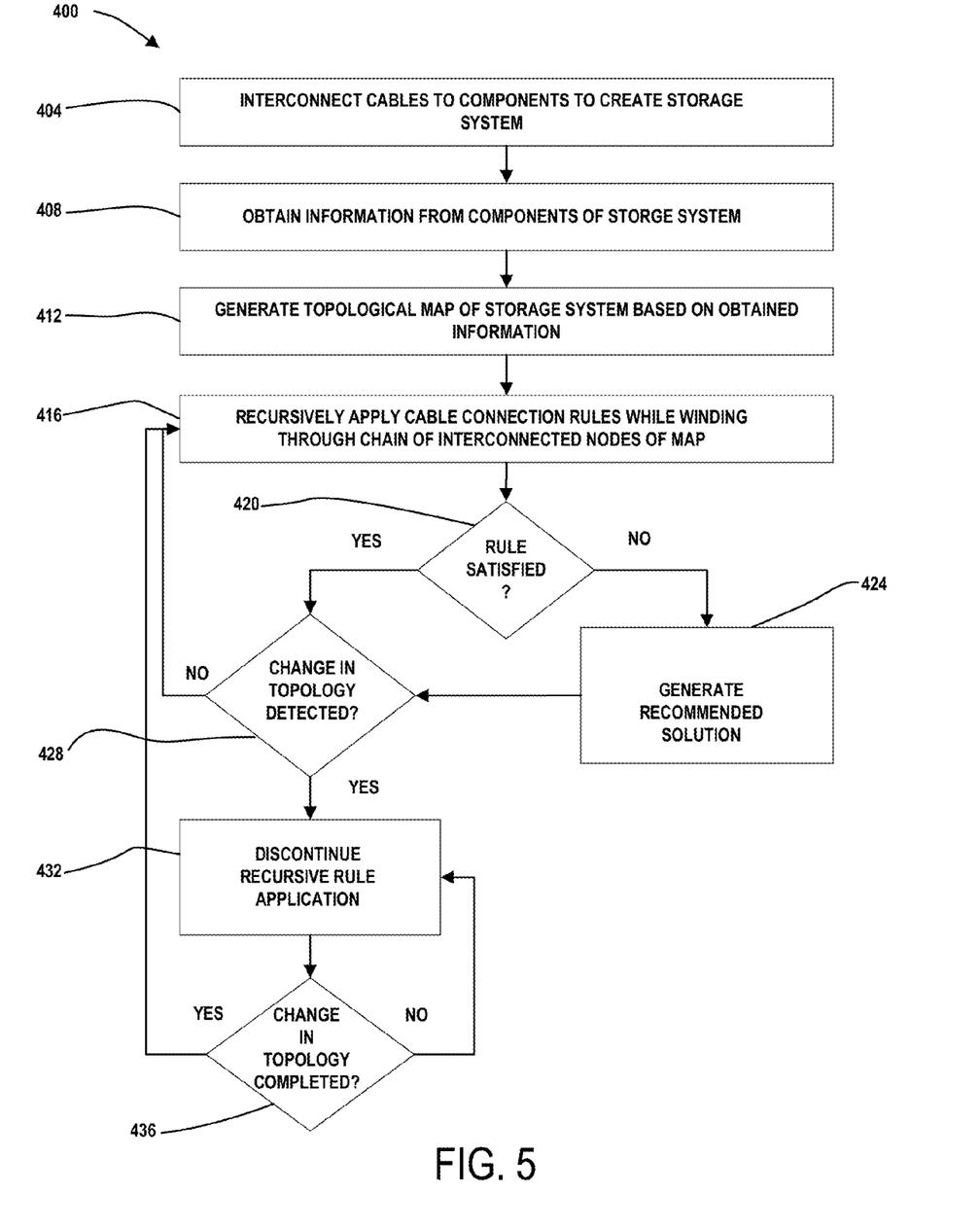
FIG. 5 is a flow diagram of a method of automatically detecting improper physical connections in a storage system or network such as that in FIG. 1 and automatically recommending corresponding changes to one or more physical connections to remedy the improper connections.

In view of the foregoing, disclosed herein are various utilities for use in automatically identifying improper physical connections in storage networks such as the storage system 100 of FIG. 1 and recommending particular actions (e.g., changes to existing physical connections) that seek to ensure symmetric and redundant connections from the host computers 104 through all of the storage enclosures 108 and reducing the likelihood that single failures prevent access to storage system data. Turning now to FIG. 5, a flow diagram of a method 400 for use in automatically identifying improper physical connections in a storage system such as that in FIG. 1 is presented. While certain steps are shown in FIG. 5, it is to be understood that fewer, additional or alternative steps may be performed in an order different than that shown in FIG. 5 unless otherwise specified.

At step 404, various physical connections (e.g., cables) such as physical connections 112, 116, 120 of FIG. 1 between host computer(s) 104 and storage enclosures 108 may be made to create a storage network or system 100. At any appropriate time (e.g., substantially continuously, according to any appropriate frequency, etc.), various types of information regarding the physical connections between the various components of the system 100 may be obtained 408 or collected in any appropriate manner. In one arrangement, and with reference to FIG. 1, each host 104 may include an information collector 162 (e.g., set of computer-readable instructions) that is configured to collect such information in any appropriate manner. As an example, the system 100 may employ a number of enumerators (e.g., software agents) that are configured to collect data for particular types of components in the system 100.

For instance, a Peripheral Component Interconnect (PCI) bus enumerator may be configured to collect information for all devices (e.g., HBAs 190) attached to the PCI bus of the host computer 104. Similarly, enumerators may be employed in any appropriate manner to collect information from each of the storage enclosures 108. In one arrangement, the collector 162 may be configured to coordinate the collection of such data from all components of the system 100. Representative types of data that may be collected by collector 162 include port addresses (e.g., first addresses such as WWNN, second addresses such as WWPN) for ports of system components (e.g., HBAs 190, expanders, etc.), PHY masks of attached cables, other host computer and expander properties, and the like. In one arrangement, the collected information may be appropriately sorted into one or more lists such as an "HBA list," a "port list," a "cable list," and/or the like. The collected information may be stored in cache in memory 154 and/or may be stored in any appropriate manner in storage 158.

Figure 2:
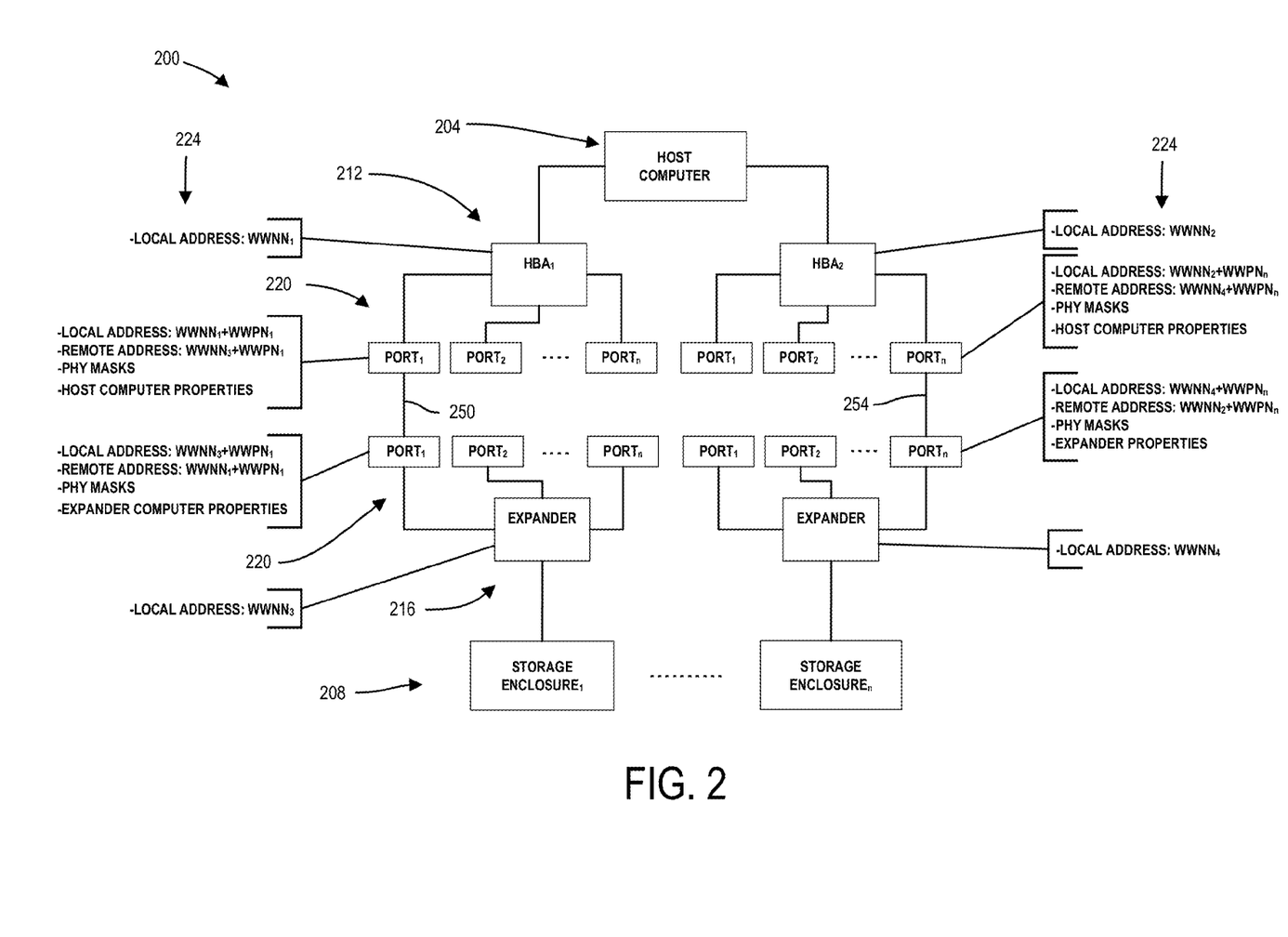
FIG. 2 is a topological map illustrating components of one portion of the storage system of FIG. 1 and physical connections between adjacent components.

Returning to FIG. 5, the method 400 may then include using the obtained information to generate 412 (e.g., with generator 166 of host computer 104, such as a set of computer readable instructions) a topological map of the storage system 100 that logically represents physically cabled connections between components of the host computer and/or the string of storage enclosures and recursively applying 416 (e.g., with analysis engine 170, such as a set of compute readable instructions) a plurality or set of cable connection rules (e.g., rules 174) to each of the connections in the map to determine whether any improper connections exists (i.e., any connections that may indicate that dual communication paths may not necessarily exist between each of the storage enclosures 108 and each host computer 104). FIG. 2 illustrates a portion 200 of a topological map of the system 100 that may be generated from the information received or obtained by collector 162.

Broadly, the map may be in the form of a tree structure of interconnected nodes (e.g., objects), where each node is a data structure or object including data that describes or defines a component (e.g., enclosure, HBA, expander, etc.) of the system 100 and/or sub-components thereof (e.g., ports, etc.). To generate the map, the generator 166 may refer to a one of the HBAs in the list of HBAs and determine whether a cable is interfaced with any of its ports. For instance, the generator 166 may surmise that a cable is attached to a first of its ports if the collected information for the first port (e.g., as collected by collector 162) includes both a local address of the first port and a remote address of another port to which the first port is interconnected. The combination of the specific addresses of the first port and the remote port define a distinct particular cable of the system 100 (such as one of physical connections 112 of FIG. 1). In the event the generator 166 determines that the collected information for a particular port of an HBA does not include a remote address, the generator 166 may surmise that a cable is not interfaced with the particular port.

With reference to FIG. 2, the generator 166 may begin with the collected information 224 of $HBA_1$ 212 of host computer 204 (e.g., $HBA_1$ 190 of $Host Computer_1$ 104 in FIG. 1) and determine that $Port_1$ 220 includes a cable 250 connected thereto because the collected information 224 for $Port_1$ 220 includes both a local address ($WWNN_1+WWPN_1$ in this example) and a remote address ($WWNN_3+WWPN_1$ in this example). For instance, $WWNN_1$ may be the unique address of $HBA_1$ 212 as to all other components in the system while $WWPN_1$ may be the unique address of $Port_1$ 220 as to all other ports of $HBA_1$ 212. The generator 166 may then begin to identify the chain of connections through the string of storage enclosures (e.g., storage enclosures 108 of FIG. 1) by way of identifying another port in the collected information 224 that has a local address identical to the remote address of $Port_1$ 220 of $HBA_1$ 212. For instance, this process may lead the generator 166 to identify $Port_1$ 220 of expander 216 of $Storage Enclosure_1$ 208 of the system because its collected information 224 includes a local address of $WWNN_3+WWPN_1$ which is the same as the remote address of $Port_1$ 220 of $HBA_1$ 212 of Host Computer 204 of the system. Accordingly, a first particular cable 250 of the system may be defined by the local addresses of the ports at its ends or in this example $WWNN_1+WWPN_1+WWNN_3+WWPN_1$.

Figure 3:
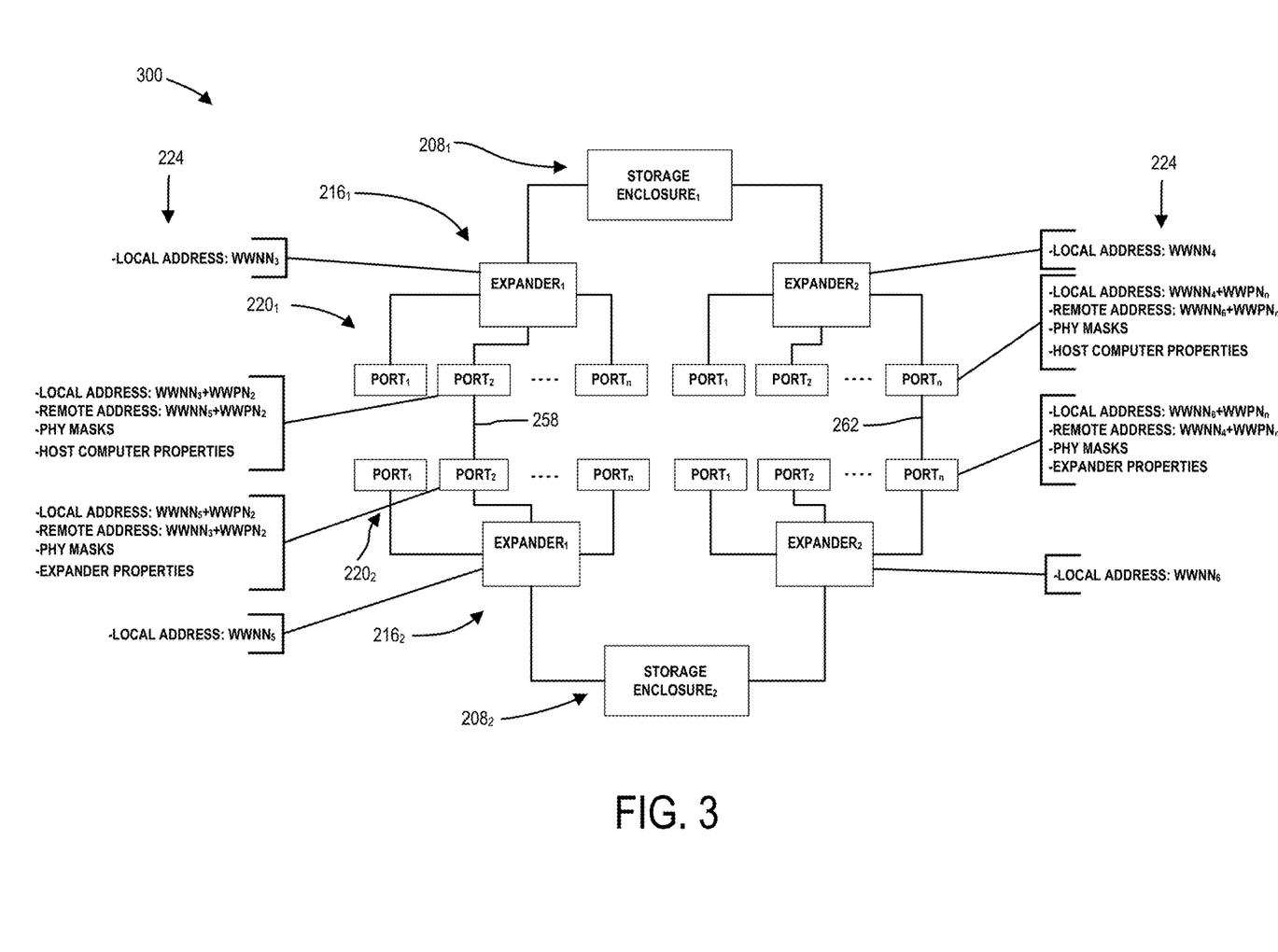
FIG. 3 is a topological map illustrating components of another portion of the storage system of FIG. 1 and physical connections between adjacent components.

Similarly, the generator 166 may then identify another port in the collected information 224 that has a local address identical to the remote address of another port of expander 216 of $Storage Enclosure_1$ 208 (i.e., a port different than $Port_1$ 220). With reference now to FIG. 3, another portion 300 of the topological map is illustrated. In this figure, assume that $Storage Enclosure_1$ $208_1$ and $Expander_1$ $216_1$ are respectively the same as $Storage Enclosure_1$ 208 and Expander 216 of FIG. 2. For instance, the generator 166 may next identify $Port_2$ $220_2$ of $Expander_1$ $216_2$ of $Storage Enclosure_2$ $208_2$ of the system because its collected information 224 includes a local address of $WWNN_5+WWPN_2$ which is the same as the remote address of $Port_2$ $220_1$ of $Expander_1$ $216_1$ of $Storage Enclosure_1$ $208_1$ of the system. Accordingly, another particular cable 258 of the system may be defined by the local addresses of the ports at its ends or in this example $WWNN_3+WWPN_2+WWNN_5+WWPN_2$.

The generator 166 may continue to recursively search through the collected information in a similar manner to identify the chain of physical connections/cables (e.g., chain 116 in FIG. 1) as well as the redundant chain of physical connections/cables (e.g., chain 120 in FIG. 1). As just a few more examples, the generator 166 may identify another distinct cable 262 defined by local addresses of the ports at its ends or in this example $WWNN_4+WWPN_n+WWNN_6+WWPN_n$ (e.g., see FIG. 3) and another distinct cable 254 defined by local addresses of the ports at its ends or in this example $WWNN_2+WWPN_n+WWNN_4+WWPN_n$ (e.g., see FIG. 2). It is to be understood that the topological map in practice may be far more complicated than that shown herein and that simplified diagrams have been presented in the interest of clarity to facilitate the reader's understanding of the disclosed utilities.

Returning to FIG. 5, the method 400 may also include recursively applying 416 (e.g., by analysis engine 170 of FIG. 1) one or more cable connection rules (e.g., rules 174 in FIG. 1) while winding through the chain or tree of interconnected nodes of the topological map for purposes of identifying possible improper cable connections, determining 420 whether the rules have been satisfied which may include alerting personnel of the same (e.g., by generating and displaying one or more particular faults), and generating 424 a recommended solution which may include recommending one or more physical changes to be made to the system 100 for purposes of remedying the improper connection (e.g., recommendations 178 in FIG. 1). Broadly, the rules may be collectively configured to impose a number of standards or "best practices" on each of the cabling connections throughout the system that seek to ensure symmetric and redundant connections from the host computer(s) 104 through all associated storage enclosures 108 and reduce the likelihood that single failures prevent access to storage system data. The same set of rules may advantageously be applied across a number of different storage systems having various potentially unique cabling configurations to identify improper connections and provide recommendations for correcting the same.

As one simplistic example, one rule may stipulate that there must be dual paths (e.g., physical connections, cables, etc.) between the first and second expanders 216 of adjacent storage enclosures 208 in the system or topological map. With reference to FIG. 3, for instance, it is noted how a cable 258 physically interconnects Expander$_1$ 216$_1$ of Storage Enclosure$_1$ 208$_1$ to Expander$_1$ 216$_2$ of Storage Enclosure$_2$ 208$_2$. In this regard, application of the above rule would stipulate that another cable must physically interconnect Expander$_2$ 216$_1$ of Storage Enclosure$_1$ 208$_1$ to Expander$_2$ 216$_2$ of Storage Enclosure$_2$ 208$_2$. As shown in FIG. 3, this rule would pass because a cable 262 (defined as WWNN$_4$+WWPN$_n$+WWNN$_6$+WWPN$_n$) physically connects Expander$_2$ 216$_1$ of Storage Enclosure$_1$ 208$_1$ to Expander$_2$ 216$_2$ of Storage Enclosure$_2$ 208$_2$.

Figure 4:
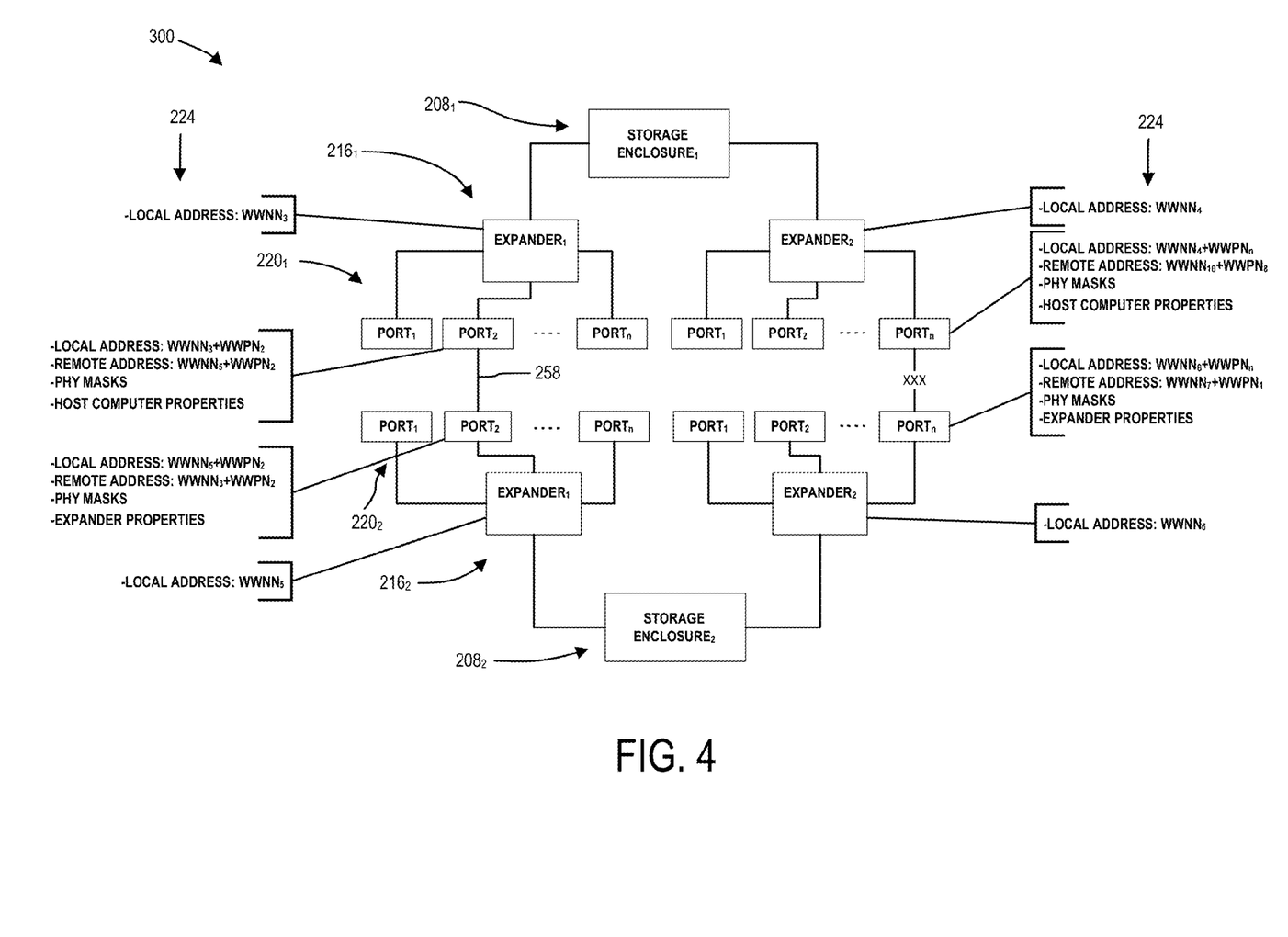
FIG. 4 is a topological map similar to that in FIG. 3 but illustrating a detected improper physical connection.

FIG. 4 presents another view of the portion 300 of the topological map similar to that in FIG. 3 but in which application of the above rule would fail. More specifically, it can be seen how Port$_n$ 220$_1$ of Expander$_2$ 216$_1$ of Storage Enclosure$_1$ 208$_1$ has a remote address (WWNN$_{10}$+WWPN$_8$) that is different than the local address of Port$_n$ 220$_2$ of Expander$_2$ 216$_2$ of Storage Enclosure$_2$ 208$_2$ (WWNN$_6$+WWPN$_n$). Also, Port$_n$ 220$_2$ of Expander$_2$ 216$_2$ of Storage Enclosure$_2$ 208$_2$ has a remote address (WWNN$_7$+WWPN$_1$) that is different than the local address of Port$_n$ 220$_1$ of Expander$_2$ 216$_1$ of Storage Enclosure$_1$ 208$_1$ (WWNN$_4$+WWPN$_n$). There is thus no cable connected between Port$_n$ 220$_1$ of Expander$_2$ 216$_1$ of Storage Enclosure$_1$ 208$_1$ and Port$_n$ 220$_2$ of Expander$_2$ 216$_2$ of Storage Enclosure$_2$ 208$_2$. Furthermore, in this example, there are no other cable connections between other ports 220$_1$ of Expander$_2$ 216$_1$ of Storage Enclosure$_1$ 208$_1$ and other ports 220$_2$ of Expander$_2$ 216$_2$ of Storage Enclosure$_2$ 208$_2$.

Accordingly, the above rule would fail and the analysis engine 170 may be configured to automatically generate an alert regarding the same (on any appropriate user interface of the host computer 104 or the like) as well as one or more recommended courses of action to remedy the above incorrect cable connection. For instance, the analysis engine 170 may generate a recommendation that the user needs to unplug the end of the cable currently interfaced with the port having a local address of WWNN$_{10}$+WWPN$_8$, unplug the end of the cable currently interfaced with the port having a local address of WWNN$_6$+WWPN$_n$, and plug the end of the cable that was just plugged into the port having a local address of WWNN$_{10}$+WWPN$_8$ into the port having a local address of WWNN$_6$+WWPN$_n$. Alternatively, the analysis engine 170 could generate a recommendation that the user needs to unplug the end of the cable currently interfaced with the port having a local address of WWNN$_7$+WWPN$_1$, unplug the end of the cable currently interfaced with the port having a local address of WWNN$_4$+WWPN$_n$, and plug the end of the cable that was just plugged into the port having a local address of WWNN$_7$+WWPN$_1$ into the port having a local address of WWNN$_4$+WWPN$_n$.

The analysis engine 170 may apply or run various other rules that query whether each of the connections follow various other standards, guidelines, best practices, or the like. For instance, one best practice or guideline is that the cable chain (e.g., chain 116) from a particular HBA 190 through the attached storage enclosures 108 is expected to be consistently attached to the first expanders on one side of the storage enclosures 108 and for the redundant chain (e.g., chain 120) to be consistently attached to the second expanders on the opposite or redundant side of the storage enclosures 108. Thus, if a cable was connected between Port$_2$ 220$_1$ of Expander$_1$ 216$_1$ of Storage Enclosure$_1$ 208$_1$ and Port$_1$ 220$_2$ of Expander$_2$ 216$_2$ of Storage Enclosure$_2$ 208 (instead of between Port$_2$ 220$_1$ of Expander$_1$ 216$_1$ of Storage Enclosure$_1$ 208$_1$ and Port$_2$ 220$_2$ of Expander$_1$ 216$_2$ of Storage Enclosure$_2$ 208 as shown in FIG. 3), a rule implementing the above guideline would fail and an appropriate recommended fix would be provided to a user. As another example, when a cable attachment point is found as the analysis engine 170 is walking the chain of enclosures, the cable attaching to the "next" storage enclosure may be expected to be found in a specific port relative to the first cable attachment point. Thus, the analysis engine 170 could apply a particular rule incorporating the above guideline and provide recommended corrections in the event the rule fails.

The following is a non-limiting exemplary table of various alerts or faults that may be generated by the analysis engine 170 and present to a user upon failure of one or more of the rules 174:

| Fault Name | Description |
| --- | --- |
| fault.io.sas.cable.partial-width: | This fault indicates that a cable has PHY fault. |
| fault.io.sas.cable.missing: | This fault indicates that an expected cable is missing, causing some storage enclosures to be single-pathed. |
| fault.io.sas.cable.wrong-receptacle: | This fault indicates that cable is connected to the wrong port. |
| fault.io.sas.cable.wrong-enclosure: | This fault indicates that a cable is connected to the wrong storage enclosure, which may indicate a single point of failure. |
| fault.io.sas.cable.too-deep: | This fault indicates that the number of daisy-chained storage enclosures exceeds a maximum or threshold number and which may result in lower performance. |
| fault.io.sas.hba.same-enc: | This fault indicates that two chains are connected to the same HBA, which may result in a single point of failure. |
| fault.io.sas.hba.unused-receptacle: | This fault indicates that there are disconnected |

| Fault Name | Description |
|---|---|
| | HBA ports which result in higher performance if they are connected. |
| fault.io.sas.hba.unbalanced-depth: | This fault indicates that the depth of storage enclosure daisy-chains is not balanced. |
| fault.io.sas.enc.too-many-cables: | This fault indicates that an enclosure has too many cable connections. |
| fault.io.sas.enc.single-path: | This fault indicates that there is a single chain on a storage enclosure, so that all disks in this storage enclosure are single pathed. |
| fault.io.sas.enc.unsupported-intermix: | This fault indicates that there are mixed storage enclosure types in one daisy-chain which may result in uncertain system behavior. |
| fault.io.sas.enc.unsupported-vidpid: | This fault indicates that there is an unsupported storage enclosure type in the storage enclosure chain. |
| fault.io.sas.enc.exp-missing: | This fault indicates that an expected expander is missing from a storage enclosure. |

The disclosed utilities may be configured to limit false positives that may otherwise occur during physical changes to the system such as adding storage enclosures, changing cable connection points, and the like. With reference to FIG. 5, the method may query 428 whether a change in the topological map of the system 100 has been detected and then discontinue 432 the recursive rule application for a period of time to inhibit such false positives. In one arrangement, upon the collector 162 receiving/collecting new or additional information from system components (e.g., from one or more of the above-discussed enumerators) and the generator 166 determining that the information is different than corresponding information in the topological map, the generator 166 may be configured to automatically trigger the analysis engine 170 to discontinue the recursive rule application for a period of time.

For instance, imagine that personnel adds a new storage enclosure 108 to the string of storage enclosures 108 of FIG. 1 which may consist of, among other cabling changes, interfacing additional cables between ports of the last storage enclosure 108 in the string and the new storage enclosure 108. The next time the collector 162 receives information from the last storage enclosure 108, the information may include local and remote address for the ports thereof that are now physically connected to the new storage enclosure. Upon receipt of the new information from the collector 162, the generator 166 may determine that the information for the above ports is different as it now includes both local and remote addresses (connoting the cables are connected thereto) whereas before it did not include remote addresses. Accordingly, the generator 166 may then trigger the analysis engine 170 to discontinue the recursive rule application for a period of time and update or otherwise revise the topological map to reflect the new or different information.

Generally the period of time that rule application is discontinued may be sufficient to ensure that any changes in the cabling configuration or topological map have been completed. As one example, the period of time that rule application is discontinued may be until the generator 166 has been able to cycle through the entire topological map and determine that no changes have been detected since a previous cycle therethrough. In another arrangement, the period of time that rule application is discontinued may be a preset period of time that is sufficient to allow for completion of such changes. In a further arrangement, a user may be able to manually set the period of time (e.g., via a user interface in communication with the host computer 104).

When it is determined 436 that the change in topology has been completed, the method 400 may continue to recursively apply 416 the rules while winding through the chain of interconnected nodes.

In some arrangements, information from the topological map may be used to physically label ports in the system (e.g., ports of the HBAs, etc.) to assist personnel in physically locating a particular port after the host computer 104 has alerted the personnel of a problem with a cable connected thereto as discussed above. However, some HBA cards and the like do not always have room for physical labels (e.g., silk-screened labels) on their back-plane or there may vendor-specific reasons for not including such labels.

In view of the foregoing, also disclosed herein are utilities that are configured to determine and provide physical locations (e.g., on a user interface) for ports of HBAs and the like, such as for HBA in which labels are not physically provided thereon for one reason or another (e.g., due to insufficient space, vendor-specific reason, the HBAs having already been incorporated into a storage system, etc.). As a result, existing hardware platforms may be leveraged free of enforcing any existing number sequence of PCIE slots, orientations (e.g., horizontal, vertical), and/or the like.

HBA drivers generally have knowledge of each of its ports physical locations based on printed circuit board (PCB) or the like. As one example, the driver may mark one port as "SAS0" (e.g., the port nearest to the occupant) and then consecutively mark the remaining ports in a clockwise fashion (e.g., as "SAS1," "SAS2," etc.). Furthermore, when an HBA card has been inserted into an occupant slot on a hardware system motherboard chassis (of host computer 104), its orientation has been defined by the orientation of the chassis slot and the position of the occupant. For example, the orientation of a given chassis can be horizontal or vertical and the occupant for a horizontal slot can be on the left or on the right. A legend may be provided on a user interface that assists personnel in identifying the relative position of each port relative to other ports of an HBA or the like. For instance, horizontal orientation platforms may use the legend "[PORT0][PORT1][PORT2][PORT3]" while vertical orientation platforms may use the same legend but orientation vertically to connote the vertical orientation of the platform.

Figure 6:
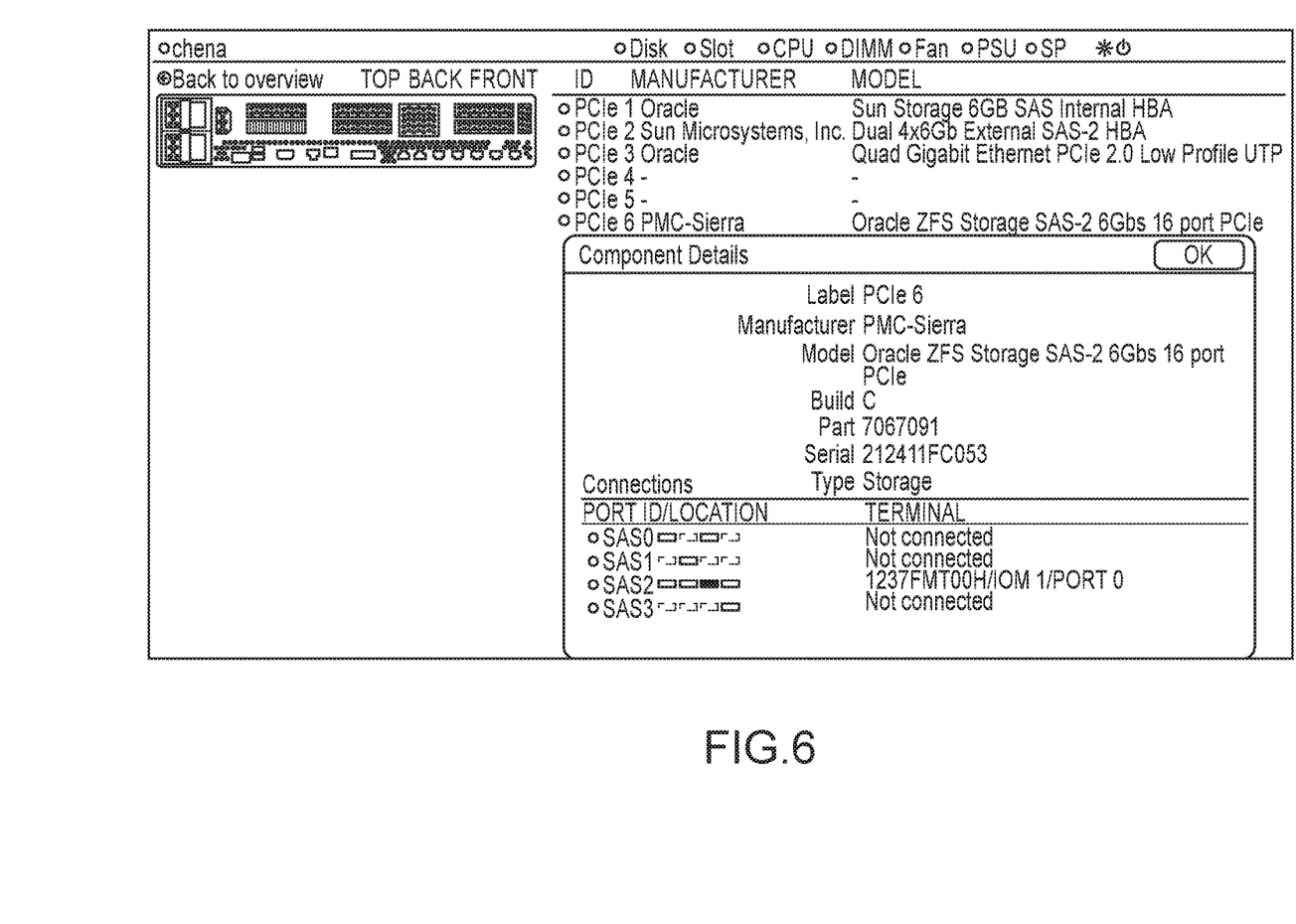
FIG. 6 is a screenshot of a user interface for illustrating a horizontal platform of the storage system.
Figure 7:
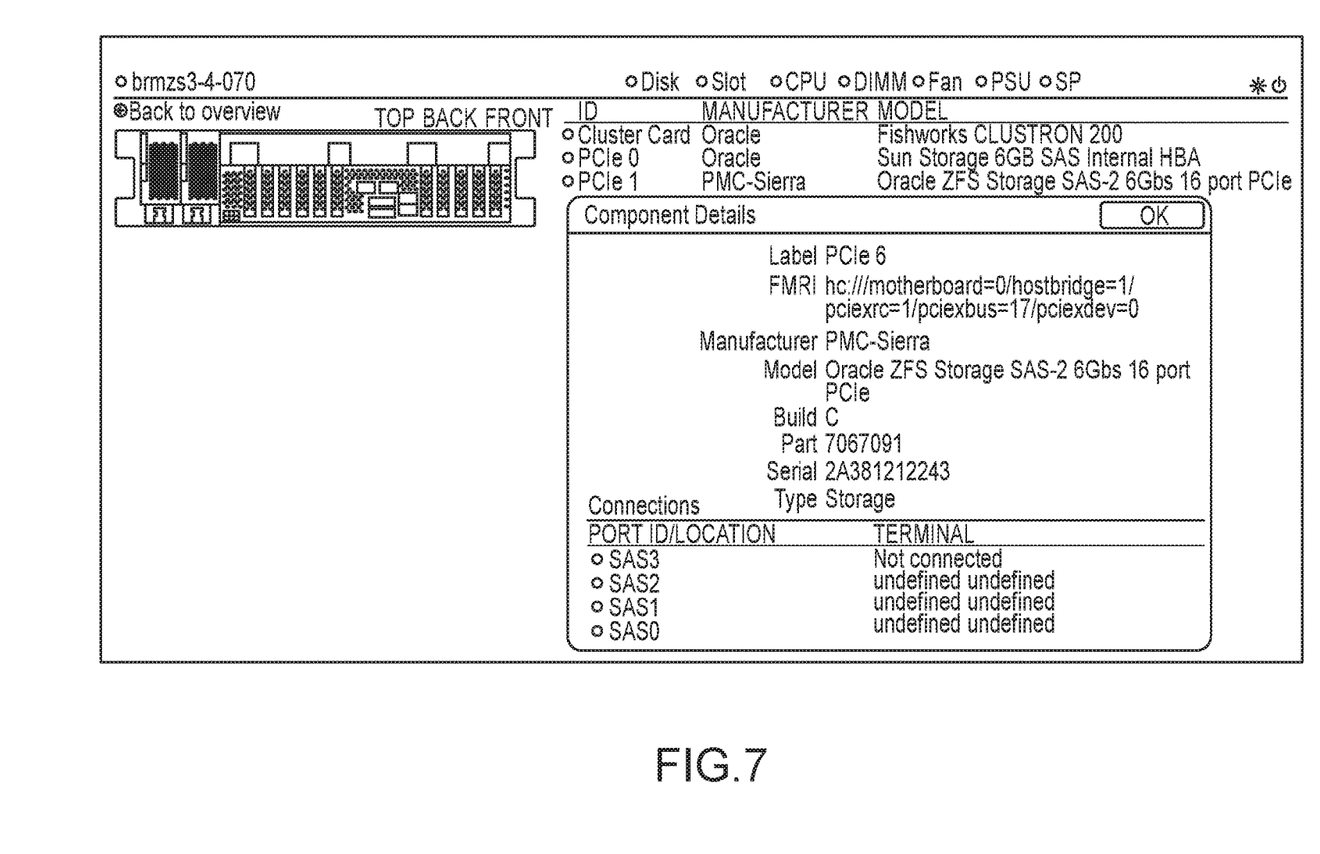
FIG. 7 is a screenshot of a user interface for illustrating a vertical platform of the storage system.

FIGS. 6-7 present screenshots of a user interface for horizontal and vertical slot platforms. The host computer 104 or the like may include any appropriate logic or the like that is configured to retrieve information from the topological map, alerts or faults regarding connections of the system, and the like and populate corresponding locations in the screenshots for the above-discussed ports. As shown in FIG. 6, for instance, it can be seen how the HBA in the "PCIe 6" slot has been manipulated to cause the display of a pop-up window that provides information regarding ports thereof. Specifically, ports labeled as SAS0, SAS1 and SAS3 are not connected to any cables while the port labeled as SAS2 is connected to a particular of another specific input output module identified as "1237FMT00H".

It will be readily appreciated that many additions and/or deviations may be made from the specific embodiments disclosed in the specification without departing from the spirit and scope of the invention. For instance, while the disclosed utilities have only been discussed in the context of the first host computer 104 in FIG. 1, it is to be understood that the second (or additional) host computers 104 may incorporate the same functionalities for use in identifying incorrect cable connections and providing recommendations for rectifying the same. As another example, while the figures illustrate the collector 162, generator 166, and analysis engine 170 being separate modules or separate sets of computer readable instructions, it is to be understood that the functionalities of the collector 162, generator 166, and analysis engine 170 may actually be incorporated into the same set of computer readable instructions or otherwise work in conjunction and that illustrating and describing the collector 162, generator 166, and analysis engine 170 as separate modules herein is merely to facilitate the reader's understanding of the present utilities.

Embodiments disclosed herein can be implemented as one or more computer program products, i.e., one or more modules of computer program instructions encoded on a computer-readable medium for execution by, or to control the operation of, data processing apparatus. For example, the logic or software of the host computers 104 may be provided in such computer-readable medium of the host computers 104 (or in other devices or systems with which the host computers are in communication) and executed by a corresponding processor or processing engine. The computer-readable medium can be a machine-readable storage device, a machine-readable storage substrate, a non-volatile memory device, a composition of matter affecting a machine-readable propagated signal, or a combination of one or more of them. In this regard, the host computers 104 may encompass one or more apparatuses, devices, and machines for processing data, including by way of example a programmable processor, a computer, or multiple processors or computers. In addition to hardware, host computers 104 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., performing DR testing, and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method for use in a storage system, comprising:
receiving, at a host computer that is interconnected to a string of storage enclosures, connection information from each of a plurality of components of the string of storage enclosures;
generating, by a processor of the host computer with the received connection information, a topological map of the storage system that logically represents physically cabled connections between components of the host computer and/or the string of storage enclosures, wherein each cabled connection in the topological map is represented by connection information of two components;

analyzing, by the processor, the physically cabled connections in the generated topological map by analyzing at least the connection information for at least one of the two components, wherein the analyzing includes applying a set of rules to at least the connection information for the at least one of the two components, wherein the set of rules queries whether the physically cabled connection follows at least one standard or guideline, and wherein the set of rules makes at least one of the following queries:
  whether a communication path from the at least one of the two components to the host computer skips an expected component;
  whether a communication path from the at least one of the two components to the host computer is connected to an unexpected component;
  whether only a single communication path from the at least one of the two components back to the host computer can be found;
  whether first and second different communication paths from the at least one of the two components to a host bus adapter of the host computer are found;
  whether a port of a host bus adapter of the host computer is unused;
  whether a number of physically cabled connections to a storage enclosure of the string of storage enclosures is greater than a threshold number of physically cabled connections;
  whether a type of one of the storage enclosures in the string of storage enclosures is different than a type of another of the storage enclosures in the string of storage enclosures;
  whether a type of one of the storage enclosures in the string of storage enclosures is unsupported by the host computer;
  whether an expected expander of one of the storage enclosures in the string of storage enclosures is missing; or
  whether the number of storage enclosures in the string of storage enclosures is greater than a threshold number of storage enclosures; and
providing, by the processor, an output based on a result of the analyzing.

2. The method of claim 1, wherein the applying includes:
applying, by the processor, the set of rules to the connection information for at least one of the two components for each of the plurality of physically cabled connections.

3. The method of claim 2, wherein applying includes:
recursively applying, by the processor, the set of rules to the connection information for the at least one of the two components to successive ones of the plurality of physically cabled connections.

4. The method of claim 1, further including:
determining, by the processor, a recommended change to the storage system based on a result of the application of at least one of the set of rules, wherein the provided output is the recommended change.

5. The method of claim 1, further including:
sensing, by the processor, a change to the topological map of the storage system;

discontinuing, by the processor, the analyzing of the physically cabled connections in the topological map for a period of time; and
commencing, by the processor after the period of time, the analyzing of the physically cabled connections in the topological map.

6. The method of claim 5, wherein the sensing includes:
receiving, at the host computer, new connection information from at least one component of the string of storage enclosures.

7. The method of claim 6, further including:
updating, by the processor, the topological map with the new connection information.

8. The method of claim 1, wherein the connection information includes one or more addresses of the component in the storage system.

9. The method of claim 8, wherein the one or more addresses are World Wide Names.

10. A storage system, comprising:
a string of interconnected storage enclosures that are electrically connected together by a plurality of physical connections; and
at least a first host server electrically connected to the string of interconnected storage enclosures by a plurality of physical connections, wherein the first host server includes:
a processor; and
a non-transitory computer readable memory including a set of computer readable instructions that are executable by the processor to:
  determine whether the plurality of physical connections between the adjacent ones of the interconnected storage enclosures and between the first host server and the string of interconnected storage enclosures complies with at least one standard or guideline for ensuring dual path routing between each storage enclosure and the first host to server; and
  generate one or more changes to the plurality of physical connections based on the determining;
wherein each adjacent pair of storage enclosures of the string of interconnected storage enclosures is independently electrically connected together by first and second physical connections, wherein the first physical connections of all of the adjacent pairs of storage enclosures collectively define a first communication chain interconnecting the first host server to the string of interconnected storage enclosures, and wherein the second physical connections of all of the adjacent pairs of storage enclosures collectively define an independent second communication chain interconnecting the first host server to the string of interconnected storage enclosures.

11. The storage system of claim 10, wherein the set of computer readable instructions are executable by the processor to determine by way of:
receiving a plurality of addresses of a plurality of ports of each of the plurality of storage enclosures; and
analyzing the plurality of received port addresses in view of the at least one standard or guideline.

12. The storage system of claim 11, wherein each of the plurality of physically connections is defined by at least first and second port addresses corresponding to first and second ends of the physical connection.

13. The storage system of claim 12, wherein the set of computer readable instructions are further executable by the processor to determine by way of:

generating, with the received plurality of addresses, a map of the storage system that represents the plurality of physical connections, wherein the analyzing includes recursively applying a plurality of rules to successive ones of the plurality of physical connections, wherein the plurality of rules query whether the plurality of physical connections comply with the at least one standard or guideline.

14. The storage system of claim 10, wherein the first host server includes at least first and second host bus adapters (HBAs), wherein a first of the plurality of physical connections electrically connects the first HBA to a first of the string of interconnected storage enclosures, and wherein a second of the plurality of physical connections electrically connects the second HBA to a last of the string of interconnected storage enclosures.

15. The storage system of claim 11, wherein the receiving includes receiving a first local address of a first of the ports and a first remote address of the first port that identifies another of the ports, and receiving a second local address of a second of the ports and a second remote address of the second port that identifies another of the ports.

16. The storage system of claim 15, wherein the analyzing includes ascertaining whether the first local address is the same as the second remote address and whether the second local address is the same as the first remote address, and wherein the set of computer readable instructions that are executable by the processor to determine include concluding that at least one of the physical connections does not comply with the at least one standard or guideline when an answer to the ascertaining is negative.

17. The storage system of claim 16, wherein the one or more generated changes include one of:
 removing an end of a first physical connection that is interconnected to one of the ports having a local address the same as the first remote address and connecting the end of the first physical connection to the second port; or
 removing an end of a second physical connection that is interconnected to one of the ports having a local address the same as the second remote address and connecting the end of the second physical connection to the first port.

18. A host server, comprising:
 a first host bus adapter (HBA) for physical interconnection to a first end of a string of interconnected storage enclosures;
 a second HBA for physical interconnection to an opposite second end of a string of interconnected storage enclosures;
 a processor; and
 a non-transitory computer readable memory including a set of computer readable instructions that are executable by the processor to:
  first determine whether first communication paths exist between each of the storage enclosures and the first HBA;
  second determine whether second communication paths exist between each of the storage enclosures and the second HBA; and
  provide an output based on the first and second determining.

19. The host server of claim 18, wherein the output includes one or more recommended changes to a) physical connections between the first and/or second HBAs and the string of interconnected storage enclosures and/or b) physical connections among the string of interconnected storage enclosures.

* * * * *

UNITED STATES PATENT AND TRADEMARK OFFICE
CERTIFICATE OF CORRECTION

PATENT NO. : 9,983,970 B2
APPLICATION NO. : 15/091721
DATED : May 29, 2018
INVENTOR(S) : Brooks et al.

Page 1 of 1

It is certified that error appears in the above-identified patent and that said Letters Patent is hereby corrected as shown below:

In the Specification

In Column 5, Line 59, delete "that that" and insert -- that --, therefor.

In Column 9, Line 26, delete "Enclosure₁208₁" and insert -- Enclosure₁ 208₁ --, therefor.

Signed and Sealed this
Twenty-ninth Day of January, 2019

Andrei Iancu
*Director of the United States Patent and Trademark Office*